Sept. 25, 1962     C. McCLELLAN PHILLIPS     3,055,162

GRAIN PICKUP ATTACHMENT

Filed March 22, 1961     2 Sheets-Sheet 1

Sept. 25, 1962   C. McCLELLAN PHILLIPS   3,055,162
GRAIN PICKUP ATTACHMENT
Filed March 22, 1961   2 Sheets-Sheet 2
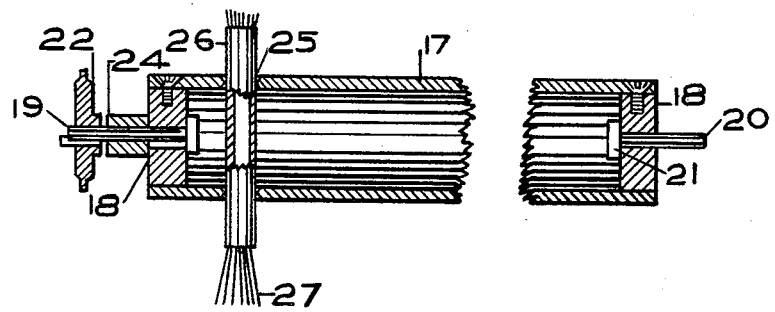
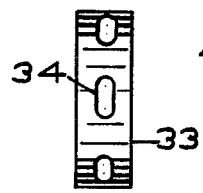
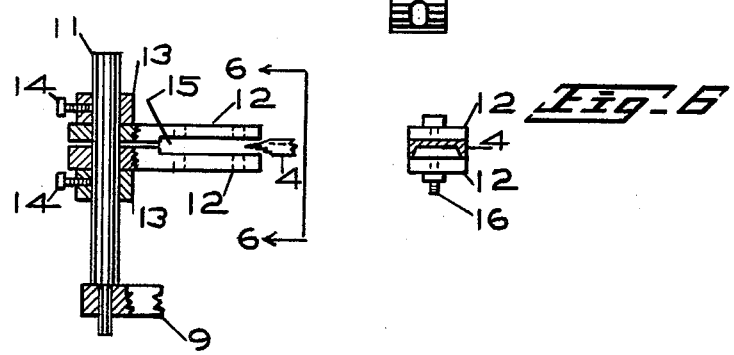
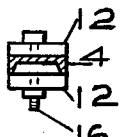

3,055,162
GRAIN PICKUP ATTACHMENT
Curtis McClellan Phillips, Rudyard, Mont.
Filed Mar. 22, 1961, Ser. No. 97,614
3 Claims. (Cl. 56—364)

This invention relates to grain pickup attachments, more particularly having reference to an attachment for picking up grain in windrows for desposit on the header platform of a combine, and for like purposes.

In the art to which the invention relates, cut grain in swaths requires to be picked up by an attachment mounted for travel in advance of the combine and deposited on the header platform or table of the combine. For this a pickup attachment is more usually employed having a drum with pickup fingers on the drum and including means for rotating the drum connectable to be driven from the combine. In this there is always considerable loss in loose grain.

The present invention is designed to effect improvements in this by provision of resilient brush carrying arms mounted in the drum and including floating guide support rings for the arms, the brush carrying arms replacing the pickup fingers in common use. In addition improvements have been effected for mounting stripper fingers for carrying the picked up grain rearward on to the combine platform and in the mounting of the drum and to provide vertical adjustment to compensate for wear of the brushes and to adapt the pickup to different working conditions. There is also included improvements in the stripper fingers to minimize loss of loose grain during passage of the grain over the stripper fingers to the combine platform.

Other features and advantages of the invention will become apparent by reference to the accompanying description taken in conjunction with the drawings.

In the drawings, wherein is illustrated a preferred embodiment of the invention, FIG. 1 is a side view of a pickup attachment in accordance with my invention, and including the combine platform, the latter being shown broken away in parts, and a fragment only of the sprocket wheel for the drum driving connection being indicated.

FIG. 3 is an enlarged side view of a drum for the bristle carrying arms, including the drum shafts and the sprocket wheel, and also including a bristle carrying arm, the drum and sprocket wheel and mounting for the sprocket wheel shaft being shown in vertical section, and the bristles shown as broken away in part.

FIG. 4 is an enlarged side edge view of a guide support ring for the bristle carrying arms.

FIG. 5 is an enlarged side view of a mounting for a castor wheel, including a fragment of a side frame bar, shown partly in section and in part broken away.

FIG. 6 is an end view of a mounting bracket for the castor wheel post, taken as viewed from a line 6—6 of FIGURE 5.

Figure 1:
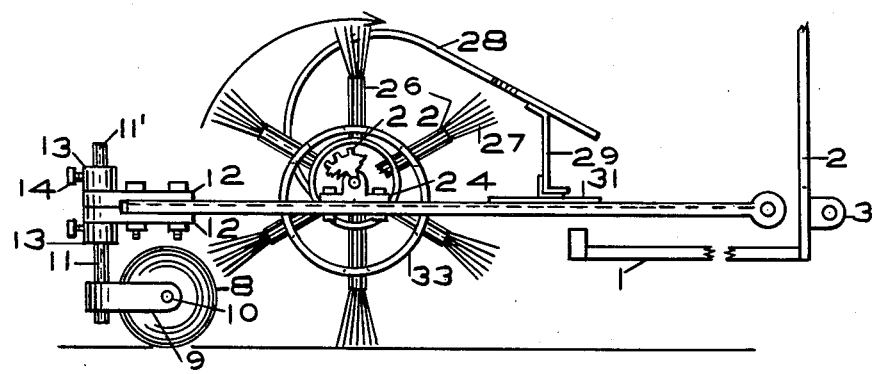
Figure 2:
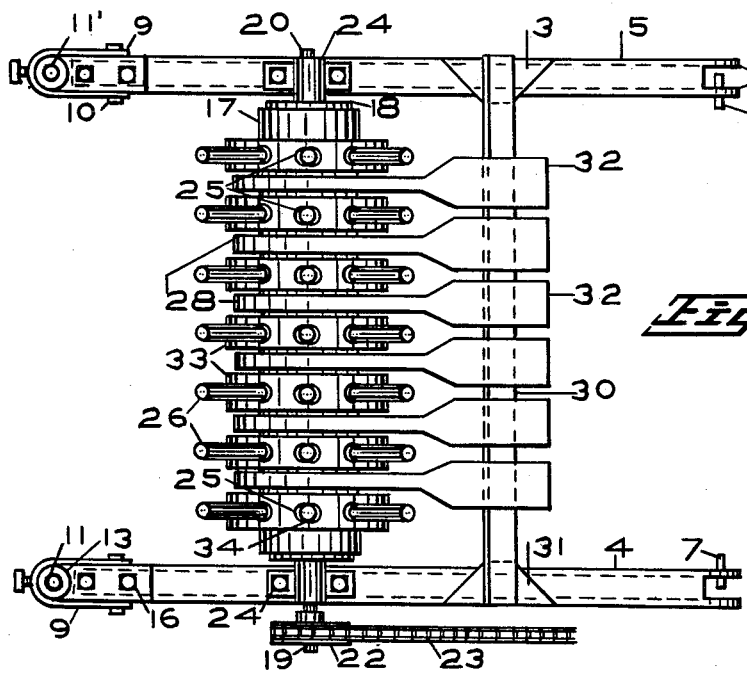
FIG. 2 is a top plan view of the pickup attachment taken by itself, including in part a drive chain for the drum, and shown with the top row of bristle carrying arms and the bristles for the remaining arms omitted.

Having reference to the drawings the grain pickup as herein shown is designed for picking up grain out of a swath and depositing the grain on the header platform of a combine or other implement with which the pickup attachment is used.

Such a combine, as in common use, would include a platform 1, with uprights, as at 2, and including lugs 3 on the uprights for pivotal engagement of the pickup attachment.

This attachment includes side bars 4 and 5 having forked ends 6 engageable with the lugs 3 by pins 7. The side bars are forwardly supported by castor wheels 8 mounted rotatable in forked arms 9 on pins 10, the arms engaging free to turn on the reduced ends 11' of post 11.

On each of the posts 11 is mounted a pair of plates 12 held by collars 13 that are secured to the posts by set screws 14 permitting vertical adjustment of the collars and plates on the post. The plates 12 are each cut away on their inner faces, as at 15, to form a fork in which is engageable a side bar 4 or 5 secured by bolts 16.

The pickup includes a drum 17 with end blocks 18 in which are fixed stub shafts 19 and 20 anchored by heads 21 (FIG. 3), the shaft 19 carrying a sprocket wheel 22 to be connectable by a chain 23 for driving the drum from a suitable driving element in the combine. The drum shafts 19 and 20 mount for rotation in bearing brackets 24 on the side bars 4 and 5.

The pickup drum is formed with rows of openings 25, these aligning in pairs, the two openings of a pair combining to receive tubular pickup arms 26 that project at both ends radially outward of the drum and carry brush bristles 27, preferably of wire or nylon, extending, in the present showing, through the arms and outward at the ends to form clusters, and these bristles would be fixed in the arms 26.

Further, the arms 26 are preferably of resilient material, rubber, plastic or nylon, or the like, and may be mounted in view of their resiliency bent somewhat in the middle for three arms forming a set to pass each other.

These sets of arms are spaced by stripper fingers 28 mounted on uprights 29, fixed thereto. These uprights are carried fixed on a cross bar 30 attached by bracket plates 31 on the side bars 4 and 5, the parts being preferably welded together.

The uprights 29 serve to elevate the delivery ends of the stripper fingers, and disengagement of the brushes is outwardly of the combine platform. To minimize loss of loose grain in passage of the grain over the rear portion of the stripper fingers, the fingers have their rear end parts formed wider, as indicated at 32.

For bracing the brush arms 26 during the period of contact of the brushes with the swath and ground, floating guide support rings 33 are used, a ring being provided for each set of brush arms. The rings have slotted openings 34 for the brush arms, permitting the rings to gravitate freely downward on the arms so that the lower ends of the arms are always braced by the rings.

In the use of the device the pickup drum is driven to carry the grain upward and back over the drum 17 for deposit on the combine platform 1. The grain pickup is made by both the arms and bristle clusters, and these give when opposed to obstructions and in the pickup movement. The arms are braced by the guide support rings 33 which engage the arms individually and collectively.

In this bracing of the guide support rings should an arm encounter an obstruction, such as a stone, the ring bracing or supporting the arm could rotate initially an amount permitted by the elongation of the openings in the rings for the arms. This permits a limited movement of the arm in passing over the obstruction, but a large obstruction would force the arm to bend back and this backward movement of the arm would be transferred to all the arms by the ring and to which it is connected. In this the ring moves upward in passing over the obstruction so that all the arms bend freely without the ring locking on the upper arms. When the obstruction is passed the arm that met the obstruction straightens out and that movement, which would be against accumulating grain, is aided by pressure from the other arms as they return to their normal radial position.

In addition to this there is provided the widened portions of the stripper fingers 28 that carry the loose grain on to the platform 1, the bristle clusters disengaging from the fingers in advance of the widened rear end parts of the fingers. The pickup is mounted pivoted to the combine to provide a floating movement of the pickup for following undulations in the ground, and it is vertically adjustable on the posts 11 to compensate for wear of the bristles and as required under different working conditions.

Having thus particularly described and ascertained the nature of my said invention, what I claim and wish to secure by Letters Patent is:

1. In a grain pickup attachment including side frame bars and a drum mounted for rotation on the side frame bars, a series of resilient pickup arms mounted in the drum projecting radially thereof and arranged in rows around the drum, and a guide support ring for each row of arms, said rings having openings therein through which the arms project, and said rings having a diameter sufficiently in excess of the diameter of the drum that the rings may gravitate downward on the arms with the lower parts of the rings engaging the outer portions of the lowermost arms on the drum.

2. A device as set out in claim 1 in which the openings on the rings for the arms are elongated to permit a limited circumferential movement of the rings on the arms.

3. In a grain pickup attachment including side frame bars and a drum mounted to be rotated on the side frame bars, a series of resilient arms mounted in the drum projecting radially thereof and arranged in rows around the drum with intervals between the rows, a cluster of brush bristles carried by each of the arms projecting outwardly thereof, and a guide support ring for each row of arms, said rings having openings therein through which the arms project, and said rings being sufficiently circumferentially larger than the drum that they may gravitate downward on the arms with the lower parts of the rings engaging the outer portions of the lowermost arms, and the openings in said rings being sufficiently large to permit free gravitational movement of the rings on the arms.

References Cited in the file of this patent

UNITED STATES PATENTS

| | | |
|---|---|---|
| 376,800 | Frisbie | Jan. 24, 1888 |
| 740,063 | Thompson | Sept. 29, 1903 |
| 1,507,317 | Laberge | Sept. 2, 1924 |
| 2,817,946 | Eliason | Dec. 31, 1957 |